US012573785B2

(12) United States Patent
Corona

(10) Patent No.: US 12,573,785 B2
(45) Date of Patent: *Mar. 10, 2026

(54) TWO-PIECE MOISTURE BLOCK LOCKING CONNECTOR

(71) Applicant: DSM&T Company Inc., Fontana, CA (US)

(72) Inventor: Sergio Corona, Fontana, CA (US)

(73) Assignee: DSM&T COMPANY INC., Fontana, CA (US)

( * ) Notice: Subject to any disclaimer, the term of this patent is extended or adjusted under 35 U.S.C. 154(b) by 463 days.

This patent is subject to a terminal disclaimer.

(21) Appl. No.: 18/062,971

(22) Filed: Dec. 7, 2022

(65) Prior Publication Data

US 2024/0195117 A1 Jun. 13, 2024

(51) Int. Cl.

*H01R 13/52* (2006.01)

*H01R 13/627* (2006.01)

(52) U.S. Cl.

CPC ..... *H01R 13/5202* (2013.01); *H01R 13/5216* (2013.01); *H01R 13/6272* (2013.01)

(58) Field of Classification Search

None

See application file for complete search history.

(56) References Cited

U.S. PATENT DOCUMENTS 8,414,330 B2 * 4/2013 Yamada ............. H01R 13/4226 439/579
2022/0077633 A1 3/2022 Provencher et al.
2024/0195119 A1 * 6/2024 Corona .............. H01R 13/5202

OTHER PUBLICATIONS

Canadian Examiner's Requisition dated Jan. 14, 2025 from corresponding Canadian Patent Application No. 3,208,186, 5 pages.
Deutsch Connectors, www.DeutschConnector.com; Copyright 2004-2022; downloaded from Internet on Dec. 7, 2022. https://www.deutschconnector.com/products/deutsch_connectors/.
Flange Mount Connectors; www.DeutschConnector.com; Copyright 2004-2022; downloaded from Internet on Dec. 7, 2022. https://www.deutschconnector.com/products/deutsch_connectors/deutsch_flange_mount_connectors/.

* cited by examiner

*Primary Examiner* — Tho D Ta

(74) *Attorney, Agent, or Firm* — Ruggiero McAllister & McMahon LLC

(57) ABSTRACT

A waterproof seal for electrical assemblies wherein an outer sheath of an electrical cable is removed to expose the wires and the insulation is removed from the wires to form a window of exposed electrical conductor, the electrical conductors being maintain apart from each other and contained in a cover that may comprise a connector, an epoxy applied to the electrical conductors to fill in all the space in and around the electrical conductors and the cover to form a waterproof seal that prevents water from wicking past the waterproof seal via an interior of the electrical cable.

38 Claims, 19 Drawing Sheets

TO BE FIXED

TWO-PIECE MOISTURE BLOCK LOCKING CONNECTOR

FIELD OF THE INVENTION

The present invention relates to a waterproof electrical connector and more specifically, to a two-piece electrical connector that is designed to mate with a Deutsch Connector where the electrical connector is mountable to a surface and includes a plurality of seals including a detachable connector body that sits over top of the connector base and forms a cavity in which the Deutsch Connector is received.

BACKGROUND OF THE INVENTION

One challenge faced in the electrical lighting industry is the prevention of water intrusion into lighting fixtures and electronics. This is especially an issue for light fixtures designed to be in wet locations such as exterior lighting, areas with standing water, or automotive and marine applications. Lighting manufacturers go to great lengths to design weather tight enclosures to prevent water intrusion and various methods have been tried with limited success.

Many problems can arise when water gets into a light fixture or into electronics. One major problem is corrosion that can shorten the life of the light fixture or electronics. Other issues relate to safety, such as short-circuits and ground-faults, that can occur as the light fixture or electronics degrade. Still other issues include reduced performance for the equipment fed by the electrical conductors extending from a leaky electrical connector.

To deal with these issues, lighting manufacturers have sought to provide better moisture seals to completely seal off the interior space of light fixtures and electronics from the outside. While manufacturers have been successful in producing very tightly sealed light fixtures and electronics enclosures, this has still not prevented water incursion.

One type of electrical connector is known as a Deutsch Connector. Deutsch Connectors are environmentally sealed, waterproof electrical connectors designed for the transportation industry. The rugged thermoplastic housings operate in temperatures from −55° C. to 125° C. and include Silicone Rubber seals. Deutsch Connectors are available with a variable number of cavities depending on the application. An example of various Deutsch Connectors can be seen at https://www.deutschconnector.com/products/deutsch_connectors/.

In some configurations, Deutsch Connectors are provided as flange mounted connectors as can be seen at https://www.deutschconnector.com/products/deutsch_connectors/deutsch_flange_mount_connectors/. However, a major problem with flange mounted Deutsch Connectors is that they tend to break. In rugged environments, such as in the automotive industry, the plugging and unplugging of a Deutsch Connector can be difficult and requires a person to pull very hard to withdraw the male connector from the flange connector. Quite often, a person will wiggle the connector from side to side as they try to work the male connector loose from the flange body. This quite often leads to cracking of the flange body as they are formed as a single unitary piece that is typically made from a hard thermoplastic material. Additionally, for flange mounted connectors that are affixed to a surface, if the screws that hold the Deutsch Connector are over-tightened, this too can crack the flange connector.

It should be noted that the Deutsch Connector has been specifically selected to be formed with a single unitary structure formed of thermoplastic material. This is important because this construction limits the water intrusion points for the connector.

When a Deutsch Connector is damaged, the entire flange connector body needs to be removed and replaced. This typically involves removing the flange connector body from the surface it is connected to, pulling the wires through the opening, and then cutting the wires that have previously been soldered to the equipment leads (e.g., light fixture, electronics equipment, etc.). Non-soldered connections are typically not acceptable because of the ruggedness of the environment. For example, if the application is a light bar on a vehicle, the vibration of the vehicle when being driven will cause connections such as wire nuts to come loose causing the equipment to malfunction. Accordingly, replacing a broken Deutsch Connector is a time and labor-intensive process. In some cases, where the wires connected to the light fixture are relatively short, the light fixture itself must be opened to unsolder the wires connected directly to the Printed Circuit Board Assembly (PCBA) and new wires solder to the PCBA. This process is not only time-consuming and labor-intensive, it also unfortunately can result in damage to the PCBA, which then requires repair or even complete replacement of the PCBA all caused by a simple broken electrical connector.

Additionally, the lamps used in some types of light fixtures can generate a significant amount of heat. When heat is generated by the lamp, it functions to heat the surrounding air inside the sealed light fixture, which in turn causes the air to expand. However, in light fixtures with very tight seals, the heated air is unable to easily escape the interior of the fixture and therefore the expanding air increases the air pressure inside the fixture. The pressurized air inside the light fixture then seeks equilibrium with the lower pressure air outside the fixture using any pathway available. One pathway is the air space inside the electrical cables (the space between the electrical conductor strands and space between the electrical conductors and the surrounding insulation). The result has been that air inside the fixture passes through the electrical cable and escapes the interior of the light fixture through the electrical fittings. However, while escaping air is not necessarily problematic, when the light fixture is turned off and the lamp inside cools down, the air inside the light fixture also cools down and contracts causing a negative pressure to develop inside the light fixture. The negative pressure functions to draw air and moisture into the light fixture through the same path that air escaped, namely, via the electrical cable and fittings. When using a Deutsch Connector, the pathway extends through the male connector and through the connector body itself. Over time, the repeated cycles of heating and cooling can cause a significant amount of moisture to be drawn into the light fixture. This moisture in turn, is subject to the heating and cooling when the light fixture turns on/off, which leads to condensation throughout the light fixture leading to accelerated corrosion, degradation, and eventual premature failure of the equipment.

In some cases, where the light fixtures are relatively large and a significant amount of water has collected in the light fixture, it has been observed that the light fixture can explode. This is caused by the excessive water that has collected in the fixture that, when heated due to the heat generated by the lamp, causes the water to transition to vapor. This in turn, causes a large buildup of pressure inside the light fixture that eventually results in the lens of the light fixture rupturing and/or shattering.

SUMMARY OF THE INVENTION

What is desired then is an electrical connector that can be mounted to a surface that prevents water from passing through the electrical connector.

It is also desired to provide an electrical connector that can be mounted to a surface that resists breaking or cracking of the electrical connector.

It is further desired to provide an electrical connector that can be mounted to a surface that is provided as a two-piece structure where the portion of the connector that forms a cavity is detachable from the portion that is mounted to the surface.

It is still further desired to provide an electrical connector that can be mounted to a surface that is resistant to breakage and is adapted to receive a Deutsch Connector.

In one configuration an electrical connector is provided that is mountable to a surface. The electrical connector is formed as a two-piece connector comprising a connector base and a connector body. In one configuration, the connector base is formed of an elastic material, while the connector body that is adapted to sit on top of the connecter base is formed of a rigid metal material.

The connector base, in one configuration, is formed as a single integral piece and is formed having a body portion and a flange section. The body portion is adapted to be inserted into an opening formed in a surface, which could be, for example, a housing of a light fixture or a mounting surface in a vehicle. The body portion may in one configuration, be provided with a series of ridges or raised portions extending circumferentially around the body portion. When inserted into the opening in the surface, the series of ridges or raised portions interact with an interior surface of the opening forming a seal preventing the ingress of water through the opening.

The connector base may further comprise a flange section that is wider than the body portion where the flange section interacts with the surface surrounding the opening preventing the connector base from being pushed through the opening. In one configuration, the flange section may be provided with two openings each opposite to each position outward from the body portion and adapted to receive a fastening member, such as a screw or the like.

The connector body, in one configuration, is formed as a single integral piece and is formed having a flange portion and a raised section. The flange portion of the connector body is adapted to interact with the flange section of the connector base. The flange portion and the flange section interact with each other such that multiple seals are formed preventing water from passing from between the flange portion and the flange section. The flange portion of the connector body is further provided in one configuration with two openings corresponding to the two openings in the flange section allowing respective fastening members to pass through both the flange section and the flange portion. When the fastening members are tightened, the flange portion is compressed onto the flange section, which in turn is compressed to the surface.

The connector body further includes a raised section that forms a cavity. The cavity is adapted to receive a male connector that in one configuration comprises, a Deutsch Connector. The connector body may, in one configuration, be formed from aluminum. Additionally, the raised section is formed with a locking mechanism adapted to interact with an arm associated with a male connecter. The locking mechanism may comprise at least one opening in the raised section adapted to receive a protrusion on the arm. In practice, when the male connector is inserted into the cavity, the protrusion on the arm will contact an inner surface of the cavity causing the arm to deflect inward. When the male connector is fully advanced into the cavity, the protrusion axially aligns with the at least one opening allowing the arm to deflect outward such that the protrusion extends through the at least one opening. This in turn, locks the male connector into the cavity preventing accidental removal of the male connector from the electrical connector.

It should further be noted that the connector base and the connector body are keyed such that the connector body can only be attached to the connector base in one direction ensuring that the electrical connector forms a proper seal between the two pieces.

It will further be understood by those of skill in the art that any number of pins may be provided in the electrical connector (e.g., 2 pins, 3 pins, 4 pins, etc.), which would further include corresponding electrical conductors.

In one configuration, the body portion receives on one end, the electrical conductors and at the other end, the pins extend from a surface of the flange section. The electrical conductors, which may comprise copper stranded conductors, may be coupled to the pins via a crimp connection or a solder connection inside the body portion.

In another configuration, the electrical conductors may have the electrical insulation surrounding the electrical conductors removed from the ends of the electrical conductors and for a longitudinal distance, such as but not limited to, 1 inch. Solder may be applied to the ends of the electrical conductors to bond the electrical conductors to the pins. Additionally, the solder may be applied to the stranded conductors over the area where the insulation has been removed. This effectively converts the stranded conductors to solid conductors for that section of the wire. The interior of the body portion can then be filled with an epoxy surrounding the ends of the pins, the solder joints and the portion of the electrical conductors within the body portion. This configuration will effectively prevent any water from traveling along the electrical conductors as the solid portions of the electrical conductors will prevent water from passing through it and the epoxy will prevent any water from traveling along the surface of the electrical conductors.

For this application the following terms and definitions shall apply:

The terms "first" and "second" are used to distinguish one element, set, data, object or thing from another, and are not used to designate relative position or arrangement in time.

The terms "coupled", "coupled to", "coupled with", "connected", "connected to", and "connected with" as used herein each mean a relationship between or among two or more devices, apparatus, files, programs, applications, media, components, networks, systems, subsystems, and/or means, constituting any one or more of (a) a connection, whether direct or through one or more other devices, apparatus, files, programs, applications, media, components, networks, systems, subsystems, or means, (b) a communications relationship, whether direct or through one or more other devices, apparatus, files, programs, applications, media, components, networks, systems, subsystems, or means, and/or (c) a functional relationship in which the operation of any one or more devices, apparatus, files, programs, applications, media, components, networks, systems, subsystems, or means depends, in whole or in part, on the operation of any one or more others thereof.

In one configuration watertight electrical connector is provided comprising, a connector base including: a body portion adapted to be inserted into an opening of a surface and forming a seal between an inner surface of the opening and an exterior surface of the body portion, and a flange section adapted to engage with the surface and having at least one hole adapted to receive a fastening member. The electrical connector further comprises, a connector body having: a flange portion adapted to interact with the flange section and form a seal between the connector body and the connector base, the flange portion having at least one opening adapted to receive the fastening member, and a raised section forming a cavity adapted to receive a male connector. The electrical connector still further comprises at least two conductors entering a proximal end of the body portion and coupled to corresponding pins mounted on the flange section. The electrical connector also comprises, a spacer having at least two openings therein to allow the at least two conductors to past through, the spacer inserted into the body portion to fill an internal space of the body portion, the spacer forming a seal between an outer surface of the spacer and an inner surface of the body portion, and an epoxy applied to at least a portion of the internal space such that the epoxy creates a seal preventing water from traveling through the body portion. The electrical connector is provided such that the connector body is detachably connectable with the body portion.

In another configuration a watertight electrical connector is provided comprising, a connector base including: a body portion adapted to be received in an opening of a surface and adapted to form a first seal between an inner surface of the opening and an exterior surface of the body portion, and a flange section having a raised area and a shoulder each positioned on a distal surface of the flange section, the flange section adapted to engage with the surface. The electrical connector further comprises, a connector body having: a flange portion having a shoulder and an upstanding wall extending around a perimeter of the flange portion, and a raised section forming a cavity adapted to receive a male connector. The electrical conductor is provided such that the raised area on the distal surface of the flange section interacts with the shoulder of the flange portion such that a second seal is formed between the cavity and the distal surface. The electrical conductor is also provided such that the upstanding wall of the flange portion interacts with the shoulder of the flange section to form a third seal between the flange portion and the flange section. The electrical connector still further comprises, at least two conductors entering a proximal end of the body portion and coupled to corresponding pins mounted on the raised area. The electrical connector also comprises, a spacer having at least two openings therein to allow the at least two conductors to pass through, the spacer inserted into the body portion to fill an internal space of the body portion, the spacer forming a fourth seal between an outer surface of the spacer and an inner surface of the body portion, and an epoxy applied to at least a portion of the internal space such that the epoxy creates a fifth seal preventing water from traveling through the body portion. The electrical conductor is still further provided such that the connector body is detachably connectable with the body portion.

Other objects of the invention and its features and advantages will become more apparent from consideration of the following drawings and accompanying detailed description.

DETAILED DESCRIPTION OF THE INVENTION

Figure 1:
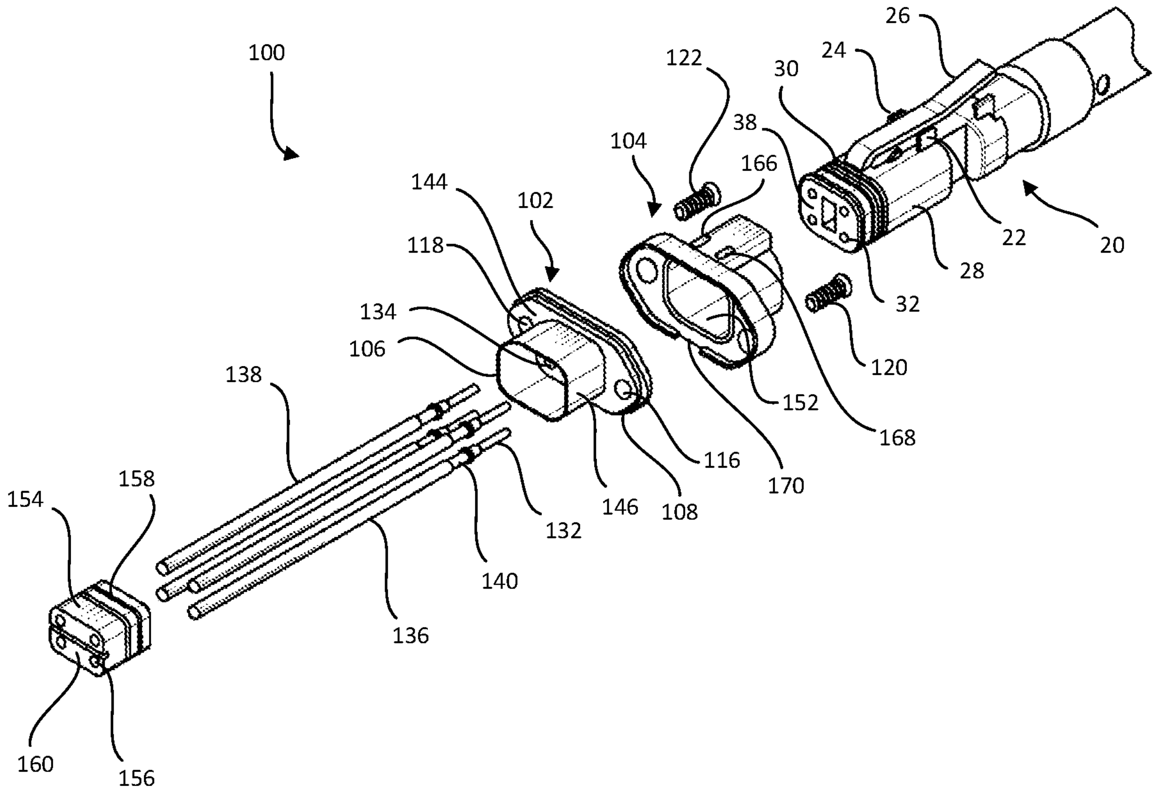
FIG. 1 is an exploded view of an electrical connector utilizing a four-pin configuration according to one configuration of the invention.

Referring now to the drawings, wherein like reference numerals designate corresponding structure throughout the views.

FIG. 1 is an exploded view of the electrical connector 100 according to one configuration of the invention. The electrical connector 100 comprises a connector base 102 and a connector body 104. The connector body 104 is detachable from the connector base 102 as shown in FIG. 1.

The connector base 102 is made from an elastic material, such as, a thermal plastic rubber (TPR), neoprene, thermoplastics elastomers (TPE), silicon, flexible polyvinyl chloride (PVC), and the like.

Figure 2:
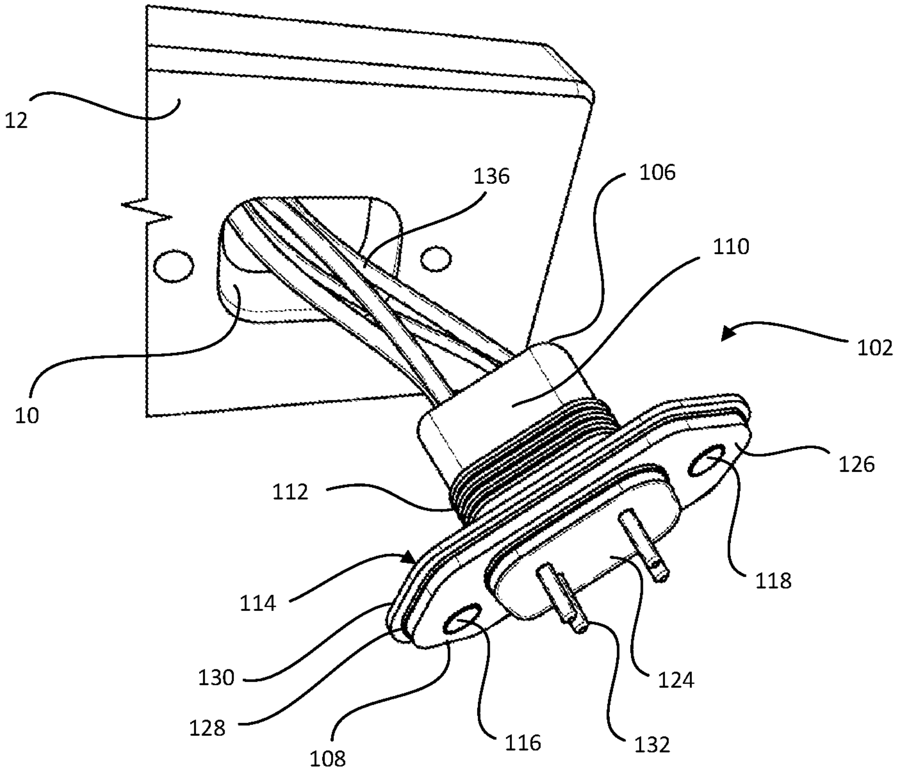
FIG. 2 is a perspective view of the connector base according to FIG. 1.
Figure 3:
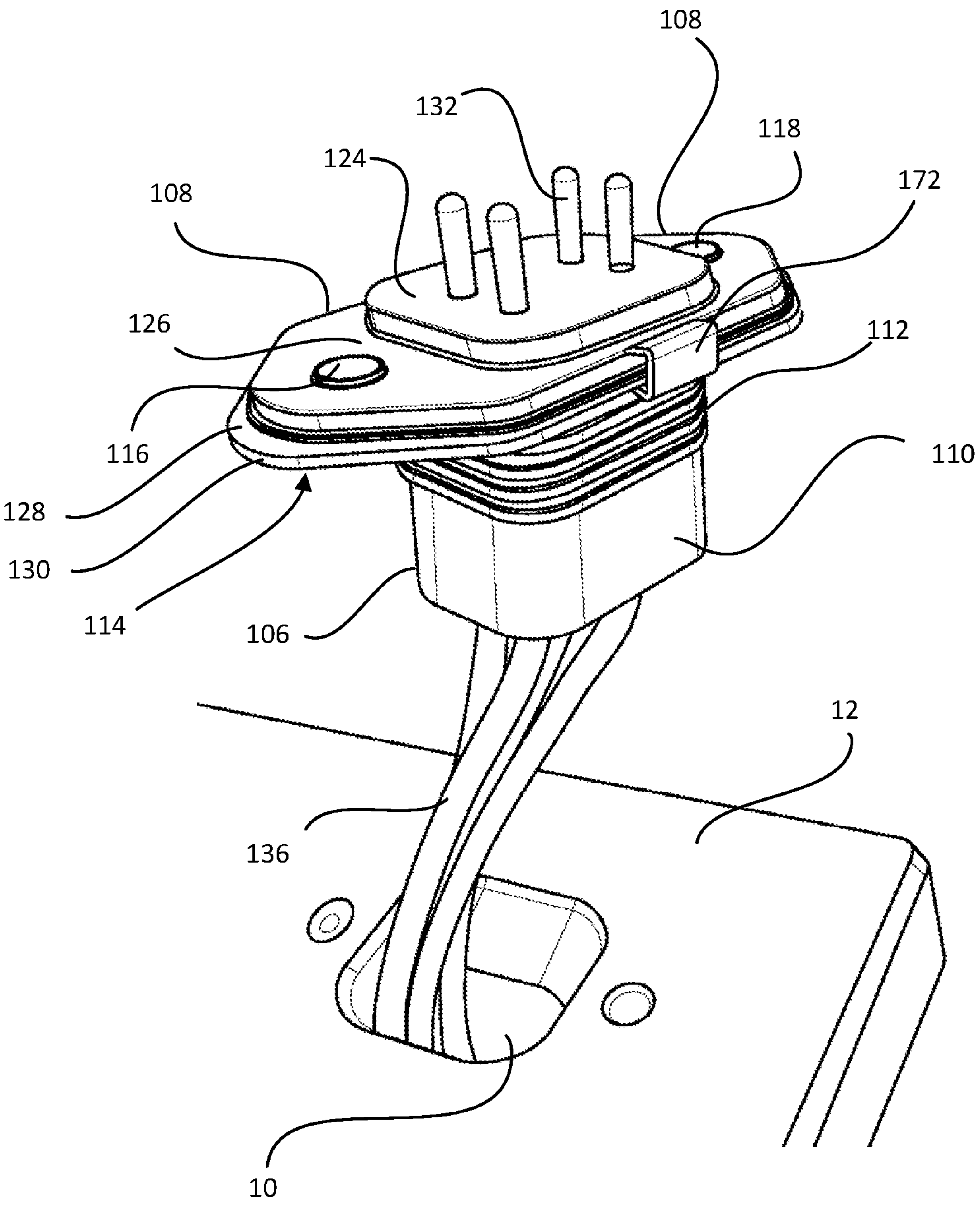
FIG. 3 is another perspective view of the connector base according to FIG. 1.

The connector base 102 is designed to fit into an opening 10 of a surface 12 as shown in FIGS. 2 & 3. A generic surface is shown in the drawings to illustrate how the electrical connector 100 can be affixed to a surface 12.

The connector base 102 comprises a body portion 106 and a flange section 108, which can variously be seen in FIGS. 1-3. The body portion 106 has an exterior surface 110, that includes a series of upstanding ridges 112. The upstanding ridges 112 are formed of the elastic material and are designed to be slightly larger in diameter than the opening 10 such that they deform when the body portion 106 is inserted into the opening 10 forming a first seal for the electrical connector 100. While five upstanding ridges 112 have been used in the current example, it is contemplated the fewer or more may be used depending on the application.

Figure 4:
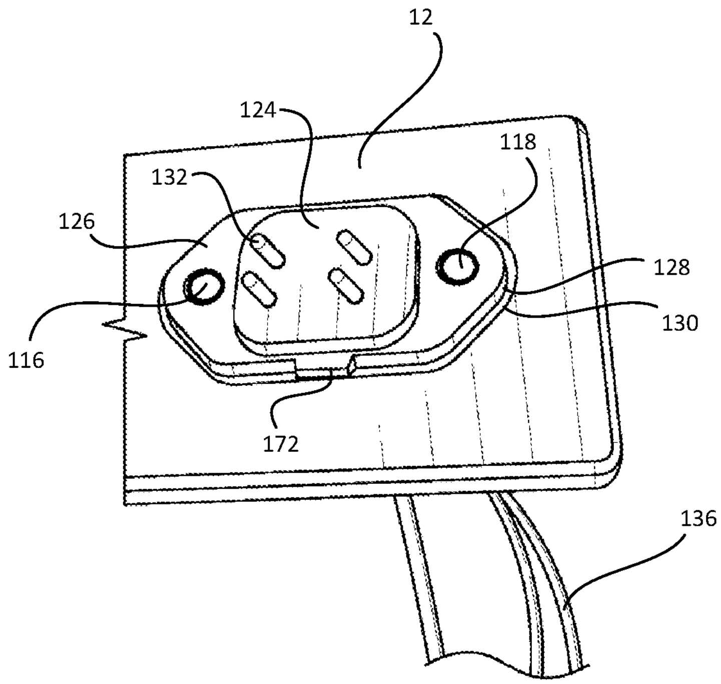
FIG. 4 is a front view of the connector base mounted to a surface according to FIG. 1.

The connector base 102 also includes flange section 108 that is formed having a perimeter larger than the body portion 106. The flange section 108 includes a contact surface 114 that is designed to lay flat against surface 12 (FIGS. 3 & 4). Additionally, the flange section 108 is formed having two elongated sections opposite each other having holes 116, 118 formed therein for receiving fastening members 120, 122 respectively as shown in FIG. 1.

The flange section 108 also includes a raised area 124 on an upper surface 126 of the flange section 108. The raised area 124 forms a step at a perimeter of the raised area 124. Also shown in FIGS. 2-4 are pins 132, which extend from holes 134 in the raised area 124. It should be noted that the holes 134 are provided having an interior diameter that is slightly smaller than the outer diameter of the pins 132. As the connector base 102 is formed of an elastic material, the holes 134 deform when the pins 132 are pushed though forming a tight seal around the pins to prevent any water from traveling around the pins 132.

The flange section 108 further includes a shoulder 128 formed around a perimeter 130 of the flange section 108. The shoulder 128 is formed as a step as can be seen in FIGS. 1-3.

In one configuration, the entire connector base 102 is formed as a single integral piece of elastic material.

The connector base 102 and the connector body 104 are keyed such that the connector body 104 can only be attached to the connector base 102 in one direction ensuring that the electrical connector 100 forms a proper seal between the two pieces. The connector body 104 includes a key 170 that is designed to interact with a corresponding key 172 formed on connector base 102.

Electrical conductors 136, which may comprise copper (Cu) stranded conductors, are connected to pins 132. In one configuration, the connection between the electrical conductors 136 and pins 132 is formed by soldering. Also shown is an area where electrical insulation 138 is removed from the electrical conductors 136 to form a section of bare wire 140. The bare wire may have a solder applied to it so that the section of bare wire effectively becomes a "solid" wire where the solder is applied. The pins 132, extend through openings 134 to extend substantially perpendicular to the raised area 124, and the area of "solid" wire and the location where the electrical conductor 136 is soldered to the end of the pin 132 is positioned within the interior of the body portion 106.

Also shown in FIG. 1 is spacer 154 that includes openings 156 designed to receive electrical conductors 136. The exterior surface of spacer 154 includes a series of upstanding ridges 158 that are designed to interact with an inner surface of a cavity (not shown) in body portion 106. The spacer 154 comprises the elastic material as described in connection with connector base 102. The electrical conductors are threaded through the openings 156 with the pins 132 extending therefrom. The spacer 154 is then inserted into the cavity (not shown) in body portion 106 such that the pins 132 are threaded through openings 134 of raised area 124.

Figure 5:
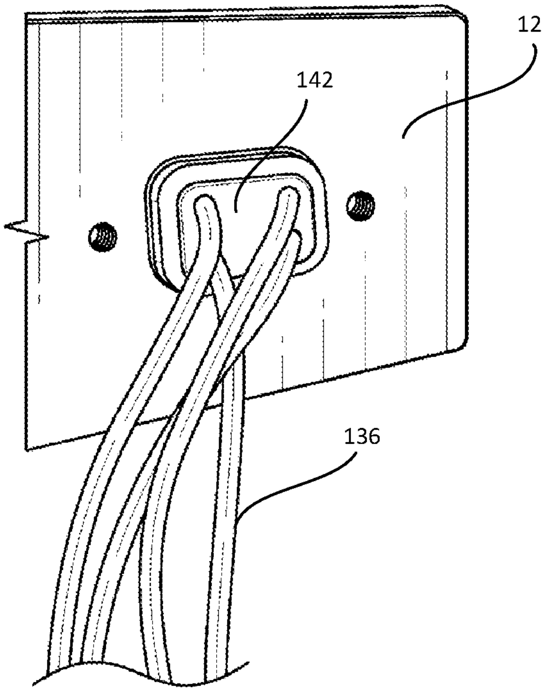
FIG. 5 is a rear view of the connector base mounted to a surface according to FIG. 1.

In one configuration, an epoxy 142 (FIG. 5) may be applied to the interior space of the body portion 106 to completely fill up any space left around the ends of the pins, the soldered joint, the "solid" wire, and the transition to the stranded wire. Additionally, the epoxy 142 may be applied to completely cover the end 160 of spacer 154.

The epoxy may be selected as a thermal conductive epoxy with high electrical resistance characteristics. In this way, water is completely prevented from traveling through the body portion 106 whether through or around the electrical conductors 136, or around the pins 132.

Figure 6:
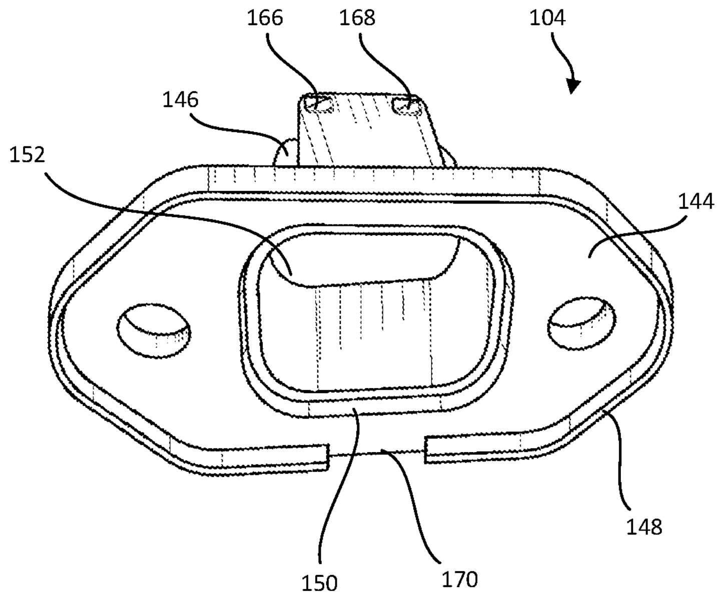
FIG. 6 is a rear view of the connector body according to FIG. 1.
Figure 7:
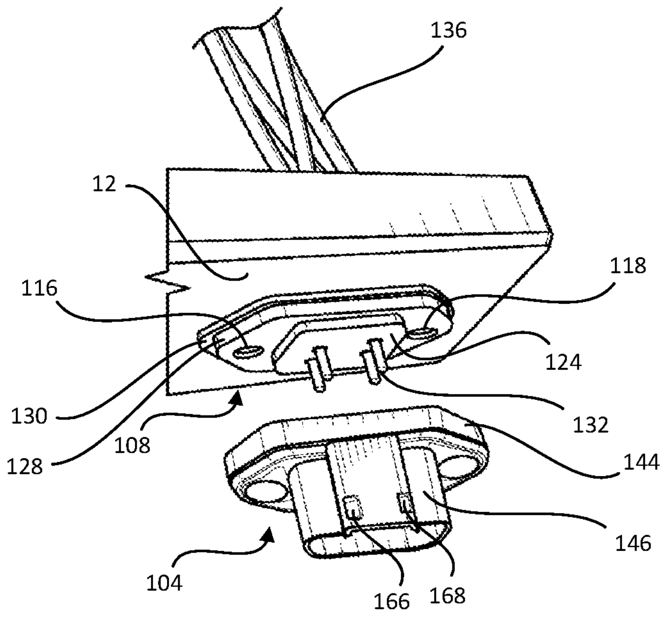
FIG. 7 is a perspective view of the connector base mounted to a surface and the connector body according to FIG. 1.
Figure 8:
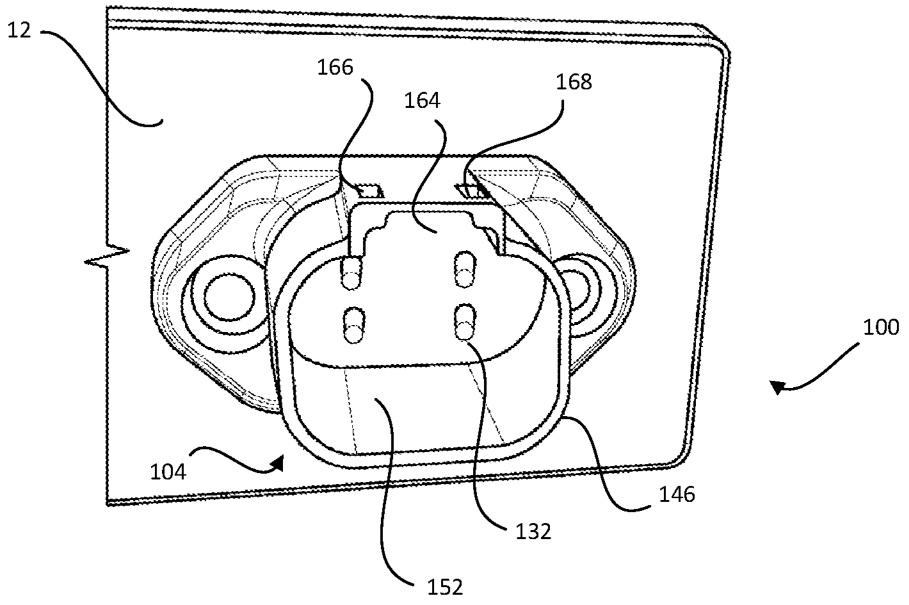
FIG. 8 is a front view of the electrical connector mounted to a surface according to FIG. 1.
Figure 9:
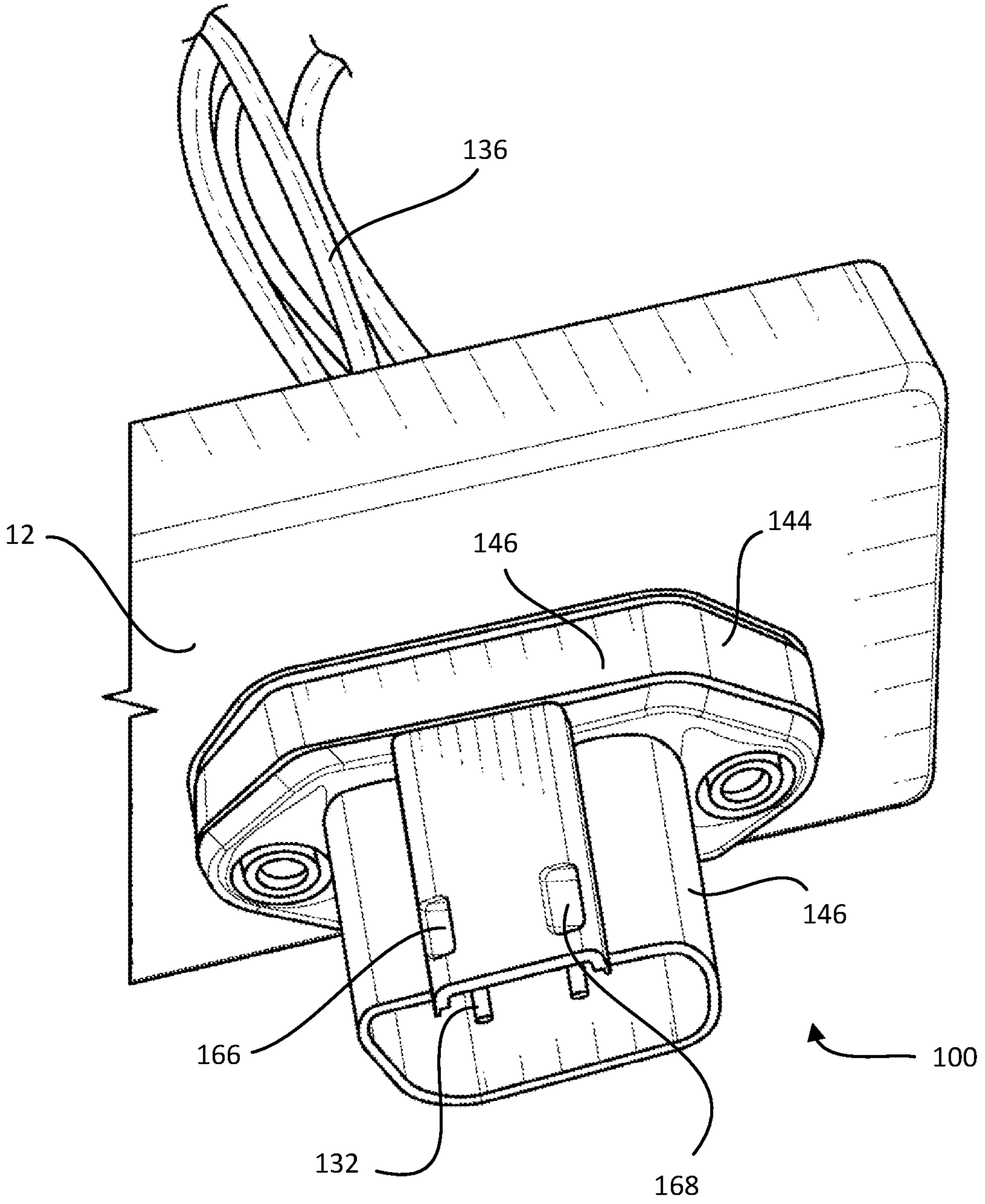
FIG. 9 is a perspective view of the electrical connector mounted to a surface according to FIG. 8.

Referring now to FIGS. 1 & 6-9, the connector body 104 is variously illustrated. As indicated in FIGS. 1, 6 & 7, the connector body 104 is detachable from the connector base 102. In one configuration, the connector body 104 is formed of aluminum, however, it is contemplated that other metal materials may effectively be utilized.

The connector body 104 comprises a flange portion 144 and a raised section 146. The flange portion 144 has a perimeter that is essentially equal to the perimeter of the flange section 108 and is designed to sit on top of the flange section 108.

Referring now to FIG. 6, an upstanding wall 148 extends around the perimeter of flange portion 144. When the flange portion 144 is fit over top of the flange section 108, the upstanding wall 148 interacts with the shoulder 128 to form a second seal around an outer edge of connector base 102 and connector body 104 for the electrical connector 100.

Also illustrated in FIG. 6 is shoulder 150 extends around a proximal end of a cavity 152 formed by raised section 146. When the flange portion 144 is fit over top of the flange section 108, an outer edge of raised area 124 interacts with shoulder 150 to form a third seal between an outer edge of the cavity 152 of raised section 146 and the and the outer edge of raised area 124 of flange section 108 for the electrical connector 100.

A locking mechanism (FIGS. 1, 6 & 8) is variously illustrated comprising a channel 164 formed in the raised section 146, which is provided with two openings 166, 168, provided therein. These two openings 166, 168 may be provided as elongated channels and are designed to interact with two protrusions 22, 24 formed on an arm 26 provided on a male connector 20.

The male connector 20 may be provided with an exterior surface 28 that may include at least one or more O-ring(s) 30 that can interact with an interior surface of cavity 152 formed by raised section 146. The arm 26 is designed to engage with channel 164 formed in the raised section 146. When the male connector 20 is fully advanced into electrical connector 100, the protrusions 22, 24 will interlock with openings 166, 168 for a lock such that the male connector 20 cannot be withdrawn without pressing downward on arm 26 to disengage the protrusions 22, 24 from openings 166, 168.

An end face 38 of male connector 20 is provided with four receptacles 32 that are designed to receive pins 132. In this configuration, there are four pins 132 and four corresponding receptacles 32.

Figure 10:
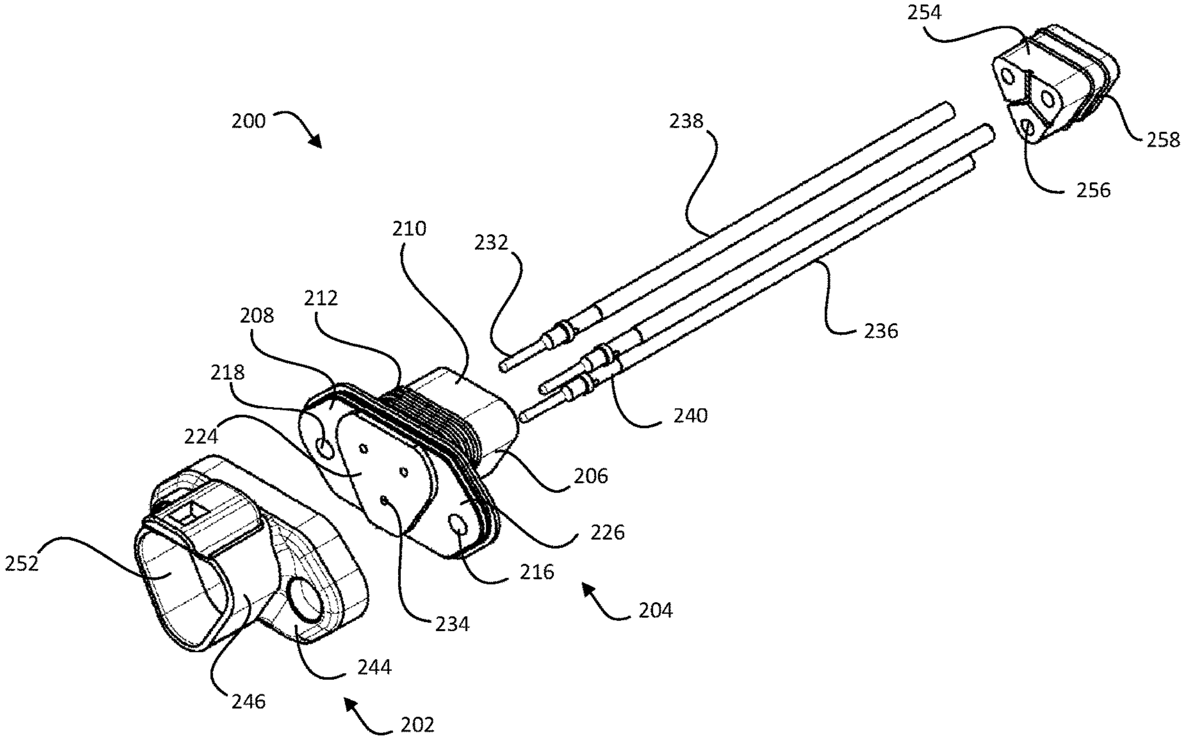
FIG. 10 is an exploded view of an electrical connector utilizing a three-pin configuration according to one configuration of the invention.

Referring to FIG. 10, an exploded view of the electrical connector 200 according to one configuration of the invention is presented. The electrical connector 200 comprises a connector base 202 and a connector body 204. The connector body 204 is detachable from the connector base 202 as shown in FIG. 10.

The connector base 202 may comprise an elastic material as described in connection with the 4-pin configuration previously described.

Figure 12:
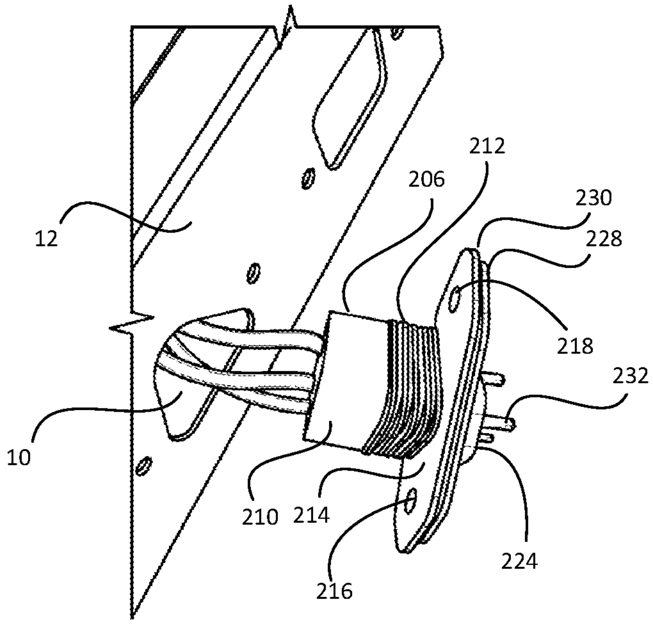
FIG. 12 is another perspective view of the connector base according to FIG. 10.
Figure 16:
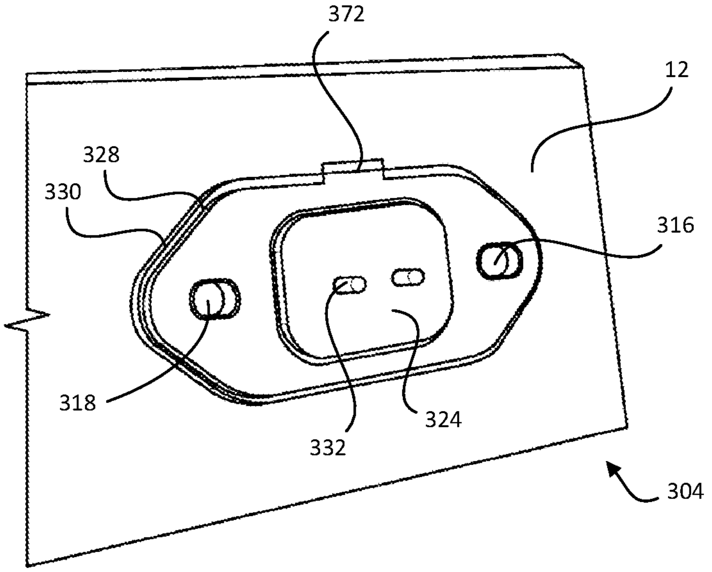
FIG. 16 is a front perspective view of the connector base mounted to a surface according to FIG. 15.
Figure 18:
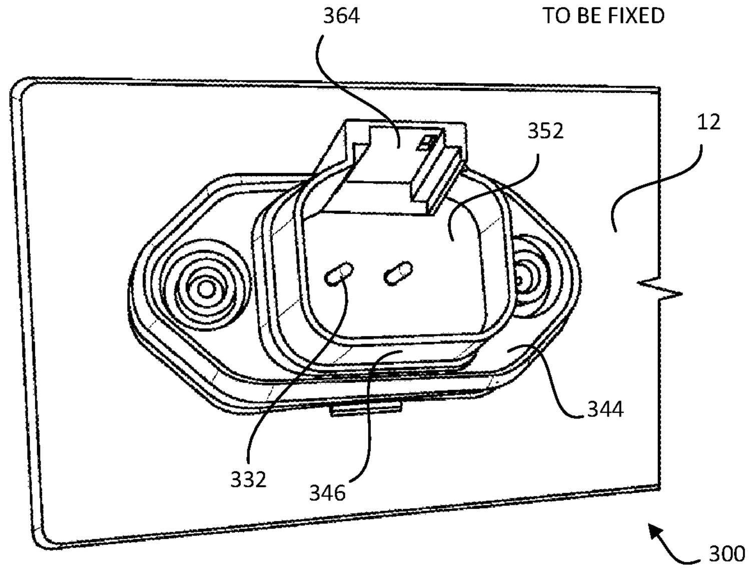
FIG. 18 is a front perspective view of the electrical connector mounted to a surface according to FIG. 15.

The connector base 202 is designed to fit into an opening 10 of a surface 12 as shown in FIGS. 12, 16 & 18. A generic surface is shown in the drawings to illustrate how the electrical connector 200 can be affixed to a surface 12.

Figure 11:
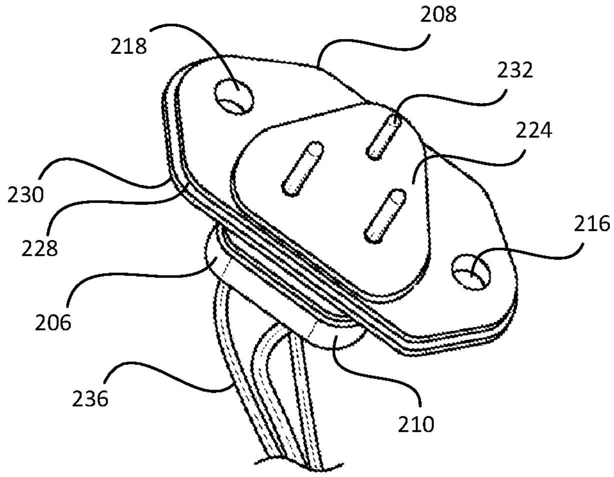
FIG. 11 is a perspective view of the connector base according to FIG. 10.

The connector base 202 comprises a body portion 206 and a flange section 208, which can variously be seen in FIGS. 11 & 12. The body portion 206 has an exterior surface 210, that includes a series of upstanding ridges 212. The upstanding ridges 212 are formed of the elastic material and are designed to be slightly larger in diameter than the opening 10 such that they deform when the body portion 206 is inserted into the opening 10 forming a first seal for the electrical connector 200. While five upstanding ridges 212 have been used in the current example, it is contemplated the fewer or more may be used depending on the application.

Figure 14:
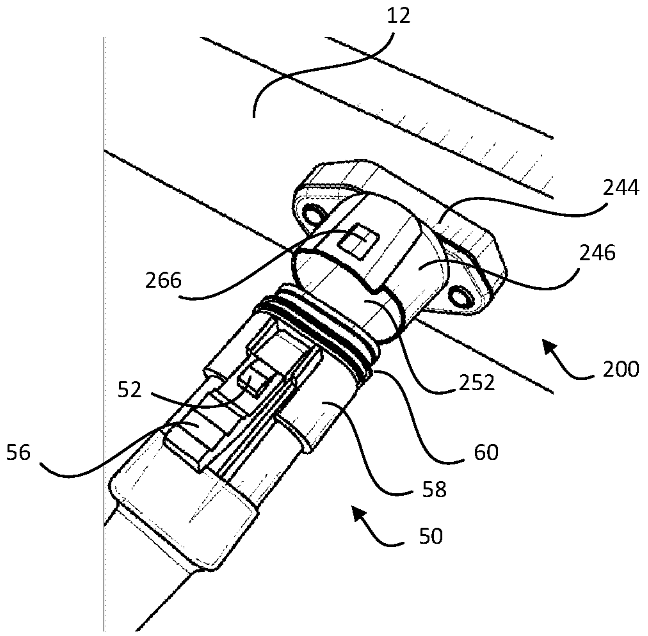
FIG. 14 is a perspective view of a male connector that can be inserted into the electrical connector according to FIG. 10.

The connector base 202 also includes flange section 208 that is formed having a perimeter larger than the body portion 206. The flange section 208 includes a contact surface 214 that is designed to lay flat against surface 12 (FIG. 14). Additionally, the flange section 208 is formed having two elongated sections opposite each other having holes 216, 218 formed therein for receiving fastening members (not shown).

The flange section 208 also includes a raised area 224 on an upper surface 226 of the flange section 208. The raised area 224 forms a step at a perimeter of the raised area 224. Also shown in FIGS. 10 & 11 are pins 232, which extend from holes 234 in the raised area 224.

The flange section 208 further includes a shoulder 228 formed around a perimeter 230 of the flange section 208. The shoulder 228 is formed as a step as can be seen in FIGS. 10-12.

In one configuration, the entire connector base 202 is formed as a single integral piece of elastic material.

The connector base 202 and the connector body 204 are keyed such that the connector body 204 can only be attached to the connector base 202 in one direction ensuring that the electrical connector 200 forms a proper seal between the two pieces. The keys are similar to that described in connection with the four-pin configuration.

Electrical conductors 236 may comprise copper and may further include a soldered section as previously described. In one configuration, the connection between the electrical conductors 236 and pins 232 is formed by soldering. Also shown is an area where electrical insulation 238 is removed from the electrical conductors 236 to form a section of bare wire 240. The bare wire may have a solder applied to it so that the section of bare wire effectively becomes a "solid" wire where the solder is applied. The pins 232, extend through openings 234 to extend substantially perpendicular to the raised area 224, and the area of "solid" wire and the location where the electrical conductor 236 is soldered to the end of the pin 232 is positioned within the interior of the body portion 206.

Also shown in FIG. 10 is spacer 254 that includes openings 256 designed to receive electrical conductors 236. The exterior surface of spacer 254 includes a series of upstanding ridges 258 that are designed to interact with an inner surface of a cavity (not shown) in body portion 206. The spacer 254 comprises the elastic material as described in connection with connector base 202. The electrical conductors are threaded through the openings 256 with the pins 232 extending therefrom. The spacer 254 is then inserted into the cavity (not shown) in body portion 206 such that the pins 232 are threaded through openings 234 of raised area 224.

In one configuration, an epoxy which may comprise a material as previously described, may be applied to the interior space of the body portion 206 to completely fill up any space left around the ends of the pins, the soldered joint, the "solid" wire, and the transition to the stranded wire. Additionally, the epoxy may be applied to completely cover the end of spacer 254.

Referring now to FIGS. 10, 13, 18 & 19, the connector body 204 is variously illustrated. The connector body 204 is detachable from the connector base 202. In one configuration, the connector body 204 is formed of aluminum, however, it is contemplated that other metal materials may effectively be utilized.

The connector body 204 comprises a flange portion 244 and a raised section 246. The flange portion 244 has a perimeter that is essentially equal to the perimeter of the flange section 208 and is designed to sit on top of the flange section 208.

Figure 13:
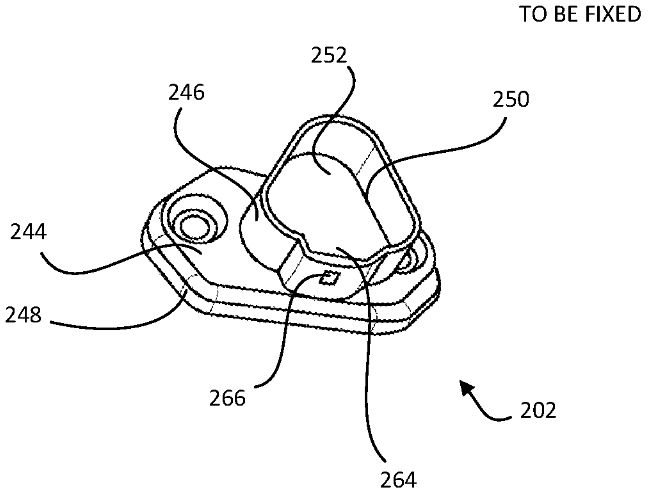
FIG. 13 is a perspective view of the connector body according to FIG. 10.

Referring now to FIG. 13, an upstanding wall 248 extends around the perimeter of flange portion 244. When the flange portion 244 is fit over top of the flange section 208, the upstanding wall 248 interacts with the shoulder 228 to form a second seal around an outer edge of connector base 202 and connector body 204 for the electrical connector 200.

Also illustrated in FIG. 6 is shoulder 250 extends around a proximal end of a cavity 252 formed by raised section 246. When the flange portion 244 is fit over top of the flange section 208, an outer edge of raised area 224 interacts with shoulder 250 to form a third seal between an outer edge of the cavity 252 of raised section 246 and the and the outer edge of raised area 224 of flange section 208 for the electrical connector 200.

A locking mechanism (FIGS. 13, 14) is variously illustrated comprising a channel 264 formed in the raised section 246, which is provided with an opening 266, provided therein. These opening 266 may be provided as elongated channels and are designed to interact with protrusion 52 formed on an arm 56 provided on a male connector 50.

The male connector 50 may be provided with an exterior surface 58 that may include at least one or more O-ring(s) 60 that can interact with an interior surface of cavity 252 formed by raised section 246. The arm 56 is designed to engage with channel 264 formed in the raised section 246. When the male connector 50 is fully advanced into electrical connector 200, the protrusion 52 will interlock with opening 266 to lock such that the male connector 50 cannot be withdrawn without pressing downward on arm 56 to disengage the protrusion 52 from opening 266.

An end face (not shown) of male connector 50 is provided with three receptacles (not shown) that are designed to receive pins 232.

Figure 15:
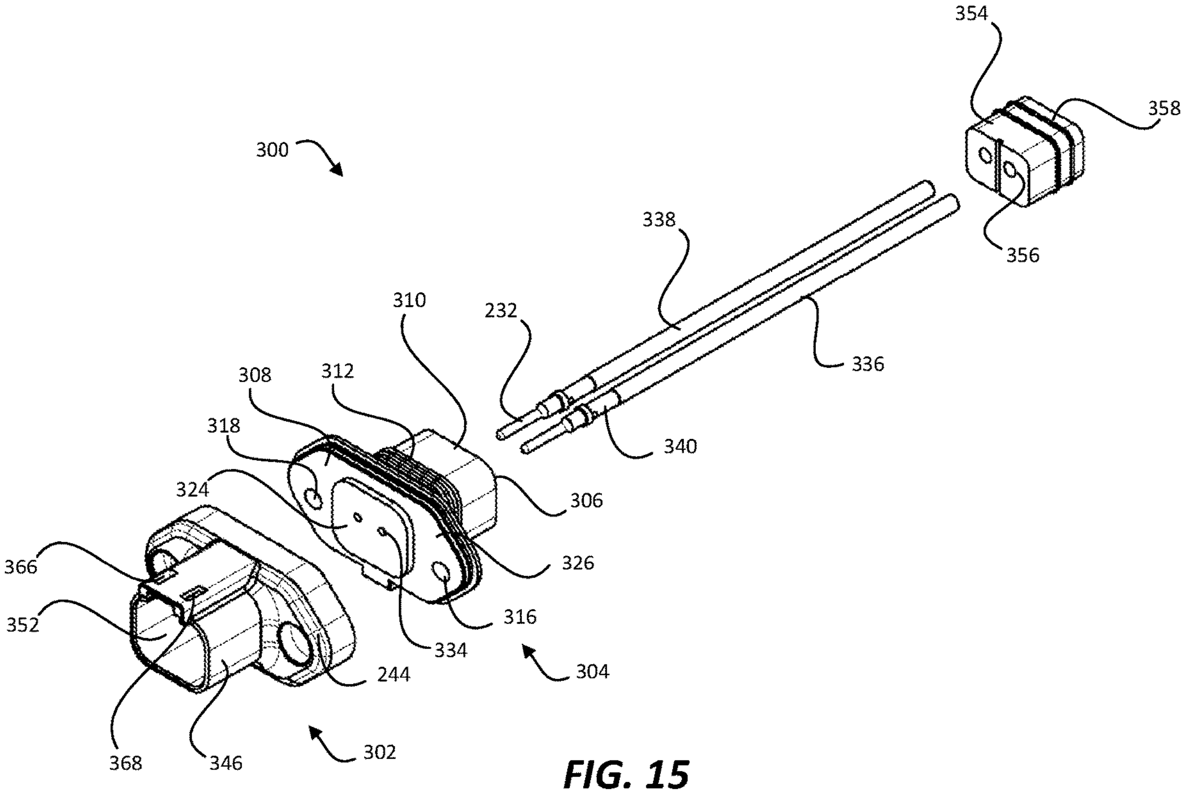
FIG. 15 is an exploded view of an electrical connector utilizing a two-pin configuration according to one configuration of the invention.

FIG. 15 is an exploded view of the electrical connector 300 according to one configuration of the invention. The electrical connector 300 comprises a connector base 302 and a connector body 304. The connector body 304 is detachable from the connector base 302 as shown in FIG. 15.

The connector base 302 may comprise an elastic material as described in connection with the 4-pin configuration previously described.

The connector base 302 is designed to fit into an opening of a surface as previously described in connection with the four-pin and three-pin versions.

The connector base 302 comprises a body portion 306 and a flange section 308, which can variously be seen in FIGS. 1-3. The body portion 306 has an exterior surface 310, that includes a series of upstanding ridges 312. The upstanding ridges 312 are formed of the elastic material and are designed to be slightly larger in diameter than the opening in which they are inserted such that they deform when the body portion 306 is inserted into the opening forming a first seal for the electrical connector 300.

Figure 19:
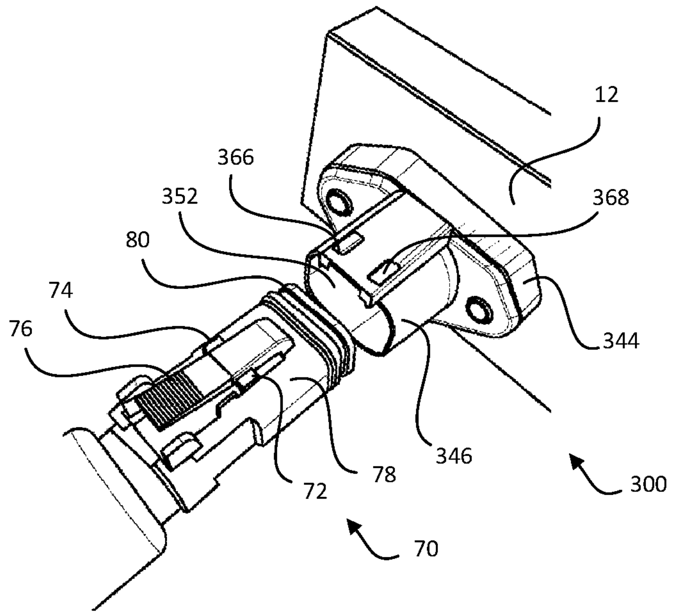
FIG. 19 is a perspective view of a male connector that can be inserted into the electrical connector according to FIG. 15.

The connector base 302 also includes flange section 308 that is formed having a perimeter larger than the body portion 306. The flange section 308 includes a contact surface 314 that is designed to lay flat against surface 12 (FIGS. 16, 18 & 19). Additionally, the flange section 308 is formed having two elongated sections opposite each other having holes 316, 318 formed therein for receiving fastening members (not shown) respectively.

The flange section 308 also includes a raised area 324 on an upper surface 326 of the flange section 308. The raised area 324 forms a step at a perimeter of the raised area 324. Also shown in FIGS. 15, 16 & 18 are pins 332, which extend from holes 334 in the raised area 324.

The flange section 308 further includes a shoulder 328 formed around a perimeter 330 of the flange section 308. The shoulder 38 is formed as a step as can be seen in FIGS. 15 & 16.

In one configuration, the entire connector base 302 is formed as a single integral piece of elastic material.

The connector base 302 and the connector body 304 are keyed such that the connector body 304 can only be attached to the connector base 302 in one direction ensuring that the electrical connector 300 forms a proper seal between the two pieces. The connector body 304 includes a key (not shown) that is designed to interact with a corresponding key 372 formed on connector base 302.

Electrical conductors 336, which may comprise copper (Cu) stranded conductors, are connected to pins 332. In one configuration, the connection between the electrical conductors 336 and pins 332 is formed by soldering. Also shown is an area where electrical insulation 338 is removed from the electrical conductors 336 to form a section of bare wire 340. The bare wire may have a solder applied to it so that the section of bare wire effectively becomes a "solid" wire where the solder is applied. The pins 332, extend through openings 334 to extend substantially perpendicular to the raised area 324, and the area of "solid" wire and the location where the electrical conductor 336 is soldered to the end of the pin 332 is positioned within the interior of the body portion 306.

Also shown in FIG. 15 is spacer 354 that includes openings 356 designed to receive electrical conductors 336. The exterior surface of spacer 354 includes a series of upstanding ridges 358 that are designed to interact with an inner surface of a cavity (not shown) in body portion 306. The spacer 354 comprises the elastic material as described in connection with connector base 302. The electrical conductors are threaded through the openings 356 with the pins 332 extending therefrom. The spacer 354 is then inserted into the cavity (not shown) in body portion 306 such that the pins 332 are threaded through openings 334 of raised area 324.

In one configuration, an epoxy which may comprise a material as previously described, may be applied to the interior space of the body portion 306 to completely fill up any space left around the ends of the pins, the soldered joint, the "solid" wire, and the transition to the stranded wire. Additionally, the epoxy may be applied to completely cover the end of spacer 354.

Referring now to FIGS. 15 & 17-19, the connector body 304 is variously illustrated. The connector body 304 is detachable from the connector base 302. In one configuration, the connector body 304 is formed of aluminum, however, it is contemplated that other metal materials may effectively be utilized.

The connector body 304 comprises a flange portion 344 and a raised section 346. The flange portion 344 has a perimeter that is essentially equal to the perimeter of the flange section 308 and is designed to sit on top of the flange section 308.

Figure 17:
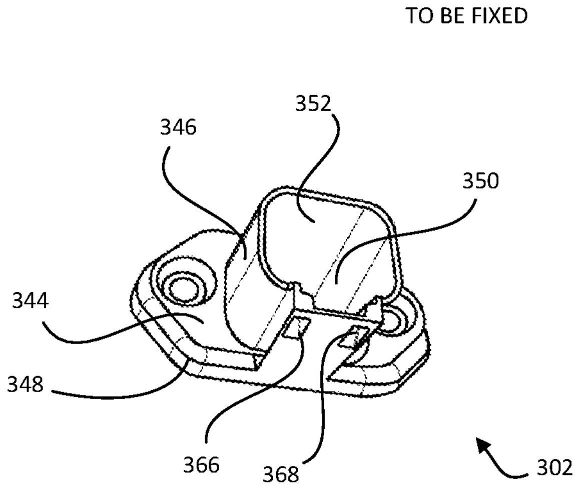
FIG. 17 is a perspective view of the connector body according to FIG. 15.

Referring now to FIG. 17, an upstanding wall 348 extends around the perimeter of flange portion 344. When the flange portion 344 is fit over top of the flange section 308, the upstanding wall 348 interacts with the shoulder 328 to form a second seal around an outer edge of connector base 302 and connector body 304 for the electrical connector 300.

Also illustrated in FIG. 17 is shoulder 350 extends around a proximal end of a cavity 352 formed by raised section 346. When the flange portion 344 is fit over top of the flange section 308, an outer edge of raised area 324 interacts with shoulder 350 to form a third seal between an outer edge of the cavity 352 of raised section 346 and the and the outer edge of raised area 324 of flange section 308 for the electrical connector 300.

A locking mechanism (FIGS. 15, 17-19) is variously illustrated comprising a channel 364 formed in the raised section 346, which is provided with two openings 366, 368, provided therein. These two openings 366, 368 may be provided as elongated channels and are designed to interact with two protrusions 72, 74 formed on an arm 76 provided on a male connector 70.

The male connector 70 may be provided with an exterior surface 78 that may include at least one or more O-ring(s) 80 that can interact with an interior surface of cavity 352 formed by raised section 346. The arm 76 is designed to engage with channel 364 formed in the raised section 346. When the male connector 70 is fully advanced into electrical connector 300, the protrusions 72, 74 will interlock with openings 366, 368 forming a lock such that the male connector 70 cannot be withdrawn without pressing downward on arm 76 to disengage the protrusions 72, 74 from openings 366, 368.

An end face (not shown) of male connector 70 is provided with two receptacles (not shown) that are designed to receive pins 332. In this configuration, there are two pins 332 and four corresponding receptacles (not shown).

Although the invention has been described with reference to a particular arrangement of parts, features and the like, these are not intended to exhaust all possible arrangements or features, and indeed many other modifications and variations will be ascertainable to those of skill in the art.

What is claimed is:

1. A watertight electrical connector comprising:

a connector base including:

- a body portion adapted to be inserted into an opening of a surface and forming a seal between an inner surface of the opening and an exterior surface of the body portion;
- a flange section adapted to engage with the surface and having at least one hole adapted to receive a fastening member;

a connector body having:

- a flange portion adapted to interact with the flange section and form a seal between said connector body and said connector base, said flange portion having at least one opening adapted to receive the fastening member;
- a raised section forming a cavity adapted to receive a male connector;

at least two conductors entering a proximal end of the body portion and coupled to corresponding pins extending from the flange section;

a spacer having at least two openings therein to allow the at least two conductors to past through, the spacer inserted into said body portion to fill an internal space of said body portion, the spacer forming a seal between an outer surface of said spacer and an inner surface of said body portion;

an epoxy applied to at least a portion of the internal space such that said epoxy creates a seal preventing water from traveling through said body portion;

wherein said connector body is detachably connectable with said body portion.

2. The watertight electrical connector of claim 1, wherein said flange section comprises a raised area on a distal surface of said flange section; and said flange portion comprises a shoulder adapted to interact with the raised area on the distal surface such that a seal is formed between the cavity and the distal surface of said flange section.

3. The watertight electrical connector of claim 2, wherein the shoulder of said flange portion is formed as a step.

4. The watertight electrical connector of claim 2, wherein the pins extend from the raised area of the flange section; and wherein the pins are adapted to engage with openings in a distal end of a male connector.

5. The watertight electrical connector of claim 1, wherein said flange portion comprises an upstanding wall extending around a perimeter of said flange portion; and said flange section comprises a shoulder adapted to interact with the upstanding wall such that a seal is formed between said flange portion and said flange section.

6. The watertight electrical connector of claim 5, wherein the shoulder of said flange section is formed as a step.

7. The watertight electrical connector of claim 6, wherein the upstanding wall sits on top of the step of said flange section.

8. The watertight electrical connector of claim 1, wherein said flange section and said flange portion each have at least two openings adapted to receive respective fastening members.

9. The watertight electrical connector of claim 1, wherein said flange section and said flange portion are keyed.

10. The watertight electrical connector of claim 9, wherein the key comprises an upstanding portion on said flange section and a cutout in the flange portion.

11. The watertight electrical connector of claim 1, wherein said raised section of the connector body includes a locking mechanism adapted to interact with an arm associated with a male connecter.

12. The watertight electrical connector of claim 11, wherein said locking mechanism includes at least one opening in the raised section adapted to receive a protrusion on the arm.

13. The watertight electrical connector of claim 12, wherein when the male connector is inserted into the cavity, the arm is deformed inward relative to the male connector, and when the male connector is fully advanced into the cavity the arm deflects outward relative to the male connector such that the protrusion engages with the at least one opening in the raised section to lock the male connector with the electrical connector.

14. The watertight electrical connector of claim 11, wherein when the male connector comprises a Deutsch Connector.

15. The watertight electrical connector of claim 1, wherein the seal between the inner surface of the opening and the exterior surface of the body portion is formed by multiple upstanding ridges provided on the exterior surface of the body portion interacting with the inner surface of the opening.

16. The watertight electrical connector of claim 1, wherein the seal between the outer surface of the spacer and the inner surface of said body portion is formed by multiple upstanding ridges provided on the exterior surface of said spacer interacting with the inner surface of said body portion.

17. The watertight electrical connector of claim 1, wherein said connector body is formed of an elastic material.

18. The watertight electrical connector of claim 17, wherein the elastic material is selected from the group consisting of: thermal plastic rubber (TPR), neoprene, thermoplastics elastomer (TPE), silicon, and flexible polyvinyl chloride (PVC).

19. The watertight electrical connector of claim 2, wherein said raised area on said flange section comprises:

at least two holes corresponding to the pins, said holes having an inside diameter that is smaller than an outer diameter of the pins;

wherein the pins are inserted through said at least two holes respectively such that the at least two holes are deformed to accommodate the outer diameter of the pins forming a seal around each pin.

20. The watertight electrical connector of claim 19, wherein pins comprise three pins each having corresponding conductors attached thereto and said at least two holes in said raised area of said flange section comprise three holes.

21. The watertight electrical connector of claim 19, wherein pins comprise four pins each having corresponding conductors attached thereto and said at least two holes in said raised area of said flange section comprise four holes.

22. The watertight electrical connector of claim 1, wherein said connector body is formed of a metal material.

23. The watertight electrical connector of claim 22, wherein the metal material is aluminum.

24. A watertight electrical connector comprising:

a connector base including:

a body portion adapted to be received in an opening of a surface and adapted to form a first seal between an inner surface of the opening and an exterior surface of the body portion;

a flange section having a raised area and a shoulder each positioned on a distal surface of said flange section, said flange section adapted to engage with the surface;

a connector body having:

a flange portion having a shoulder and an upstanding wall extending around a perimeter of said flange portion;

a raised section forming a cavity adapted to receive a male connector;

wherein the raised area on the distal surface of said flange section interacts with the shoulder of said flange portion such that a second seal is formed between the cavity and the distal surface;

wherein the upstanding wall of said flange portion interacts with the shoulder of said flange section to form a third seal between said flange portion and said flange section;

at least two conductors entering a proximal end of the body portion and coupled to corresponding pins mounted on said raised area;

a spacer having at least two openings therein to allow the at least two conductors to pass through, the spacer inserted into said body portion to fill an internal space of said body portion, the spacer forming a fourth seal between an outer surface of said spacer and an inner surface of said body portion;

an epoxy applied to at least a portion of the internal space such that said epoxy creates a fifth seal preventing water from traveling through said body portion;

wherein said connector body is detachably connectable with said body portion.

25. The watertight electrical connector of claim 24, wherein the shoulder of said flange portion and the shoulder of said flange section are each formed as a step.

26. The watertight electrical connector of claim 24, wherein the exterior surface of the body portion comprises multiple upstanding ridges.

27. The watertight electrical connector of claim 24, wherein said flange section and said flange portion each include at least one opening adapted to receive a fastening member.

28. The watertight electrical connector of claim 27, wherein said flange section and said flange portion each include two openings adapted to receive respective fastening members.

29. The watertight electrical connector of claim 24, wherein said flange section and said flange portion are keyed.

30. The watertight electrical connector of claim 24, wherein said raised section of the connector body includes a locking mechanism comprising an opening adapted to interact with a protrusion on an arm associated with a male connecter.

31. The watertight electrical connector of claim 24, wherein the exterior surface of said spacer comprises multiple upstanding ridges.

32. The watertight electrical connector of claim 24, wherein said connector body is formed of an elastic material.

33. The watertight electrical connector of claim 32, wherein the elastic material is selected from the group consisting of: thermal plastic rubber (TPR), neoprene, thermoplastics elastomer (TPE), silicon, and flexible polyvinyl chloride (PVC).

34. The watertight electrical connector of claim 32, wherein said raised area on said flange section comprises:

at least two holes corresponding to the pins, said holes having an inside diameter that is smaller than an outer diameter of the pins;

wherein the pins are inserted through said at least two holes respectively such that the at least two holes are deformed to accommodate the outer diameter of the pins forming a seal around each pin.

35. The watertight electrical connector of claim 34, wherein pins comprise three pins each having corresponding conductors attached thereto and said at least two holes in said raised area of said flange section comprise three holes.

36. The watertight electrical connector of claim 34, wherein pins comprise four pins each having corresponding conductors attached thereto and said at least two holes in said raised area of said flange section comprise four holes.

37. The watertight electrical connector of claim 24, wherein said connector body is formed of a metal material.

38. The watertight electrical connector of claim 37, wherein the metal material is aluminum.

* * * * *